United States Patent [19]

Eckels

[11] 4,119,084

[45] Oct. 10, 1978

[54] BUILDING WITH PASSIVE SOLAR ENERGY CONDITIONING

[76] Inventor: Robert E. Eckels, 2101 Youngfield, Golden, Colo. 80401

[21] Appl. No.: 795,786

[22] Filed: May 11, 1977

[51] Int. Cl.² ............................................. F01K 19/10
[52] U.S. Cl. .................... 126/270; 237/1 A
[58] Field of Search .............. 126/270, 271; 237/1 A

[56] References Cited

U.S. PATENT DOCUMENTS

| | | | |
|---|---|---|---|
| 2,857,634 | 10/1958 | Garbade et al. | 126/270 X |
| 3,243,117 | 3/1966 | Morgan | 126/270 X |
| 3,244,186 | 4/1966 | Thomason | 126/270 X |
| 3,412,728 | 11/1968 | Thomason | 126/270 |
| 3,832,992 | 9/1974 | Trombe et al. | 126/270 |
| 3,841,302 | 10/1974 | Falbel | 126/270 |

Primary Examiner—Allen M. Ostrager
Attorney, Agent, or Firm—Richard D. Law

[57] ABSTRACT

A structure or building with a solar energy collecting system in an upright wall, arranged to face the sun, has a heat storage unit adjacent the wall for storing heat absorbed by the collecting system in sunlight, and for releasing the heat to the interior of the building in the absence of sunlight during those seasons requiring additional heat for the building, and a solar heat collector system for the building is arranged to provide a chimney effect for circulating air through the structure during seasons when heating of the structure is not desired.

12 Claims, 6 Drawing Figures

BUILDING WITH PASSIVE SOLAR ENERGY CONDITIONING

Many different types of solar heated and cooled building structures have been proposed during the course of many years. The common elements for the utilization of solar energy include a solar heat collector, a heat storage unit, a heat transfer medium, and means for circulating the heat transfer medium between the collector and storage unit. Such a system, of course, requires a rather sophisticated control system for operating the movement of the heat transfer medium and a control of the unit in relation to the weather conditions, the heat demand of the structure, etc. When the unit also includes an air conditioner, such elements as a compressor, evaporator, cooling coils, air circulator, and the like are in addition to the other elements. In each case, the unit uses a substantial amount of energy for the operation of the elements for movement of the heat transfer medium, for the operation of the necessary valves directing the flow of a heat transfer medium and for the control system for the operations. Very few passive units for either solar heating or cooling have been found to be effective.

According to the present invention there is provided a passive solar heater and air circulation system for buildings and structures, and this provides a major object and advantage of the invention.

Another object of the invention is to provide a structure for small buildings, such as dog houses, or the like, having means for heating and storage of solar heat, and means for circulating cooling air through the structure.

Still another object of the invention is to provide a passive solar heat collector and heat storage system for a building structure.

Yet another object of the invention is to provide a building structure for small movable buildings arranged for sun facing on one side to collect and store heat, and for sun facing on the opposite side to reflect heat from the building and to provide air circulation through the structure.

An additional object of the invention is to provide a modified "A" frame structure for dog houses and other small structures having passive solar energy collection means, heat storage and radiation means and passive solar energy air circulating means.

These and other objects and advantages of the invention may be readily ascertained by referring to the following description and appended illustrations in which.

Figure 1:
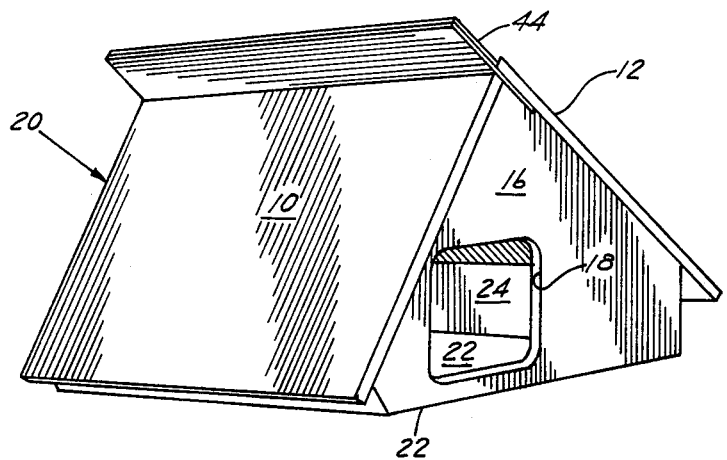
FIG. 1 is a perspective view of a modified "A" frame structure utilizing the system of the invention.

In general, one form of the structure of a building, according to the invention, is either movable or rotatable at least 180°, so that one side may face the sun in one mode of operation and by turning 180°, the opposite side of the building may face the sun for another mode of operation. In this first mode of operation, a heat collecting mode, a roof or wall is coated with a monolayer of transparent spheres mounted on a black absorbing surface. The spheres track the sun at all angles of declination or inclination for seasonal movement and all angles of daily sun movement. The spheres collect and concentrate the sun's rays at any of its positions where the rays fall on the surface, in accordance with my copending application Ser. No. 556,807, filed Mar. 10, 1975 for Solar Heat Collector, now U.S. Pat. No. 4,033,324 issued July 5, 1977. Such a system provides an increased temperature of the absorbed solar radiation, and provides a quantity of heat which may be stored when the sun's rays strike the spheres either in the early morning, full daylight or late evening. A heat storage unit includes an eutectic salt, or similar substance, which absorbs heat to melt the material, and the material gives up heat when it cools and changes state. The heat storage unit is in heat transfer with the interior of the building so that heat given up by the material is mostly transferred into the interior of the building, however, some may be released back through the absorber. During the warmer seasons of the year, the building may be turned around so that the solar radiation is reflected from the surface facing the sun, generally south. The reflecting surface keeps the wall or roof from absorbing solar radiation and, therefore, tends to keep the structure cool. A heat collection or absorption means is mounted in the structure, and vents may be opened in warm weather to provide a chimney effect so that the heat collection means forms a chimney effect to draw air from the interior of the building and/or the exterior. By providing air entrance from the shaded side of the building, cooler air is circulated through the unit.

In one form, a modified "A" frame building provides a sloped roof or wall for generally south facing. However, by using the mono-layer of spheres, on a black absorbing background, a vertical, horizontal or intermediate angle surface of wall or roof may be used. The modified "A" frame, shown in FIGS. 1–5 of the drawing, includes a solar radiation absorbing roof side 10 and a reflecting side 12. The reflecting side 12 includes an insulated panel or section 14, which combined with the highly reflected surface 12 keeps the inside of the section cool even under direct radiation of the sun. The construction of the solar absorber side 10 is explained below. The structure is further closed by end 16 which has an opening 18 for a dog house permitting an animal to enter, and a full wall 20, not shown, on the opposite end. The bottom or floor 22 completes the enclosure. Stub wall 24 closes the opening between the floor 22 and the wall 14, and stub wall 26 closes that side of the structure between the floor 22 and the absorber 10.

Figure 5:
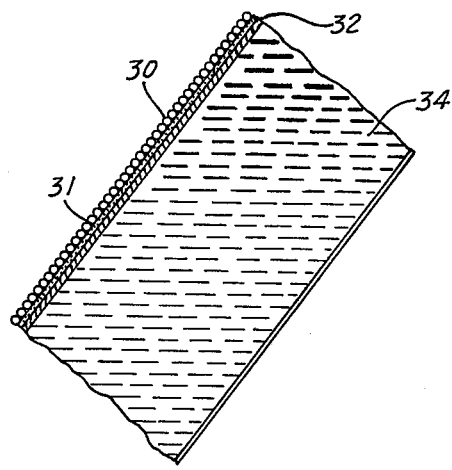
FIG. 5 is an enlarged detail of the absorption surface and backing thereof.

The structure of the wall/roof section 10 is shown in enlarged detail in FIG. 5, wherein a series of clear solar energy transmitting spheres 30 are adhered by an adhesive 31 to black surface on support surface 32. The spheres adhesive, shown as substantially thicker than used in actual practice for purposes of illustration, are mounted in a mono-layer on a supporting wall 32. The supporting wall 32 is in heat transfer contact with a container 33. The container contains the eutectic salt or other material, for example, a parafin or wax 34 having a low melting point, which is in good heat transfer with the support material 32. As the sun's rays strike the spheres, the spheres being optical focusing units, focus the sun's rays on the material 32 which is heated and in turn the heat is transferred to the eutectic material 34. As the eutectic material 34 heats, it reaches a change of state temperature, usually its melting temperature. Sufficient heat is absorbed at this temperature until it is wholly melted. Additional heat transferred through the member 32 provides latent heat to the now liquid material 34 in the container 33. On cooling, the material gives up its latent heat to its change of state temperature, then gives up its heat of change of state.

Figure 2:
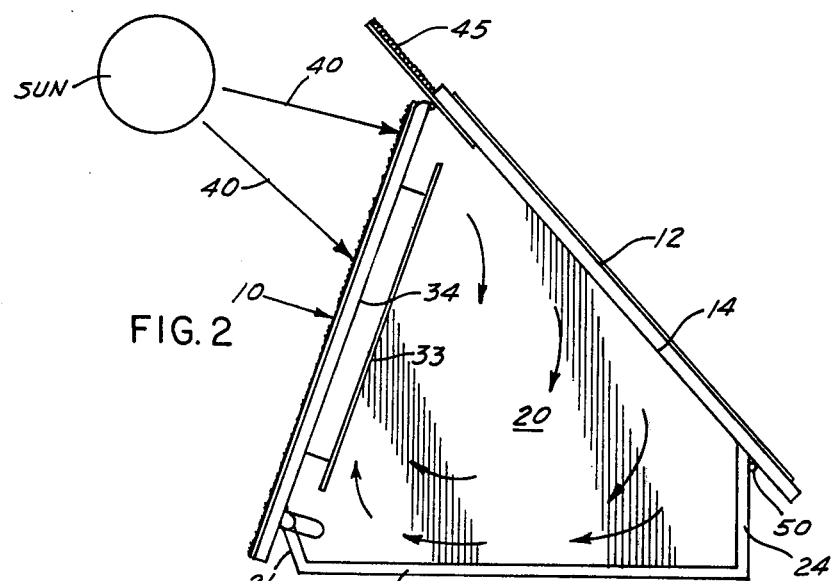
FIG. 2 is a schematic, side elevational view of a structure, according to the invention, illustrating the solar heat collecting and storage mode of the unit.

In the heating mode shown in FIG. 2, the sun's rays 40 are absorbed by absorber and heat subsequently is transferred into the eutectic material 34. As the material 34 heats it, of course, heats the interior of the building. With walls 14, 24, 26 and floor 22 adequately insulated, the building interior will heat. After the sun is no longer exerting its rays on the surface, the eutectic material 34 slowly cools. As it cools, it gives up heat to the interior of the building. Some heat may be radiated back through the support 32 to be radiated through the absorbed surface 10. With the container 33 of metal, heat is easily transferred through it into the interior of the building. The eutectic material cools and the latent heat of the material is transferred into the interior. When the material reaches a phase change the heat of the phase change given up by the material is transmitted into the building. By having an ample supply of material in the container, the building will be heated for a number of hours after the sun no longer heats the surface.

At the top of the side 12 is a metal sheet 44, which is coated with a black heat absorption substance and a mono-layer of spheres 45. As shown in FIG. 1, the sheet metal extends along the crown of the building for its length, and generally at the angle of the roof section 12. However, this angle may be changed as desired. The sheet metal 44 is in general parallel arrangement with another sheet 46 which extends along and is secured to the side 10. This sheet 46 may be a plain piece of sheet metal or other type of material. The metal member 44 is a heat transfer material, such as copper, sheet steel and the like to heat the air between the two sheets for the chimney effect. The mono-layer of spheres 45 are similar to those spheres 30 on the side 10. The side 12 is secured by a hinge 50 at the bottom, which permits the side 12 to pivot slightly open at the top so that the sheet metal 44 is spaced from the sheet 46. The roof side 10 is pivoted by a hinge 51 at the top so that it may pivot slightly from the bottom to permit air to pass under the bottom of the side 10 across the stub wall 26 and subsequently out between the two sheets 44 and 46. The bottom of the wall 10 may be held out away from the stub wall 26 by means of a bracket 55 having an L slot 56 therein with a pin 57 mounted on the stub wall 26 riding in the slot. The slot includes an angle portion 56a which permits the roof side 10 to be held away from the stub wall 26. The bracket 55 is mounted by means of a pin 58 to a fixture 58a on the wall 10. A similar type of unit may be provided on top of the wall 12 to hold it in spaced relationship with the sheet metal 46. A gasket member 59 may be placed along the top of the stub wall 26 to provide secure sealing of the wall 10 against the stub wall 26. In a similar manner, gaskets may be provided along the top edge of the wall 12 and the edges thereof for the sealing of the roof sections 12. Also, the roof section 10 may be sealed with gaskets along the edge of the edge walls so that the unit may be made essentially airtight when in the closed and heat absorbing position.

Figure 3:
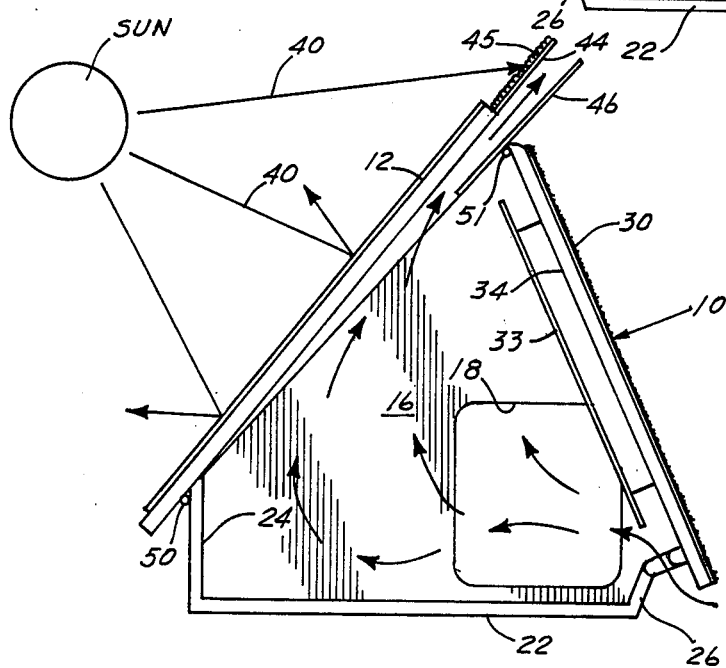
FIG. 3 is a schematic, side elevational view of a structure according to the invention illustrating the solar energy air circulation mode of the unit.
Figure 4:
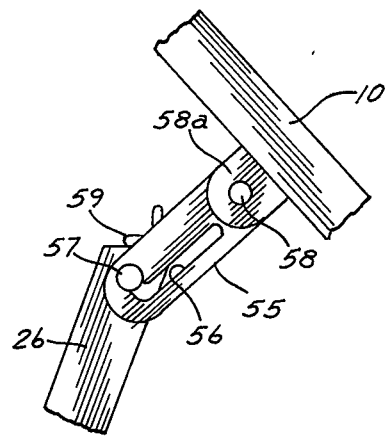
FIG. 4 is an enlarged detail view of a latch arrangement for holding one edge of a wall of the building open for circulation of air through the building.

In the mode of FIG. 3, sun's rays 40 striking the absorber 45 heats the metal plate 44 so that there is a chimney effect between the plate 44 and the plate 46. This heats the air between the two sheets causing a motion of the air between the plates upwardly and a draft from the interior. Air, from the now shaded side 10, passes under the bottom of the roof section 10 into the interior along with air from the opening 18 passing upwardly therethrough to provide a circulation of air in the building.

Figure 6:
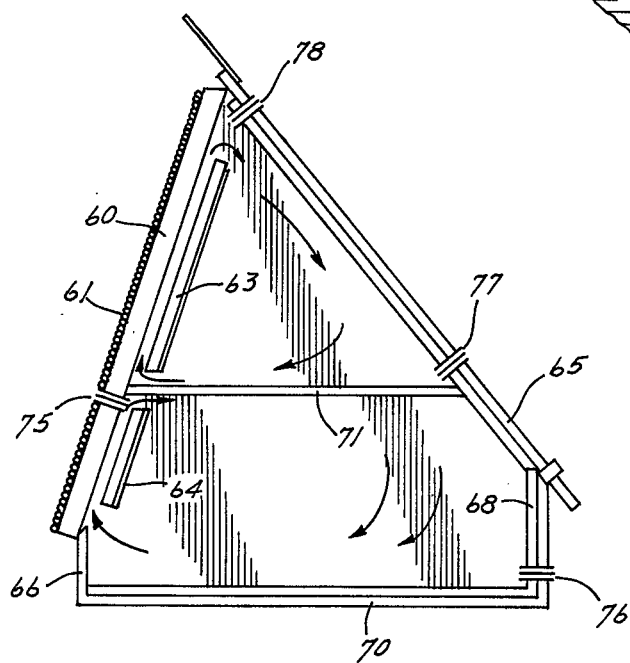
FIG. 6 is a schematic, side elevational view of a modified structure according to the invention.

A further modified "A" frame structure of FIG. 6, illustrates the invention in a larger, two story structure. The modified "A" frame includes an absorber wall/roof 60, having a black exterior surface and a mono-layer of spheres 61, in the manner described for FIG. 5. The wall also contains an eutectic material. This wall faces generally south to be impinged on by the sun's radiation. An insulator material 63 is spaced from the interior of the upper part of the eutectic containing wall 60. A similar insulator 64 is spaced from a lower portion of the wall on the lower floor. Both insulators are fixedly secured in position with an air gap between them and the absorbing heat storing wall. Another roof/wall section 65, opposite wall 60 is in contact with the top of section 60 and forms the other roof portion. A stub wall 66 completes the south facing roof and a stub wall 68 completes the opposite wall. A bottom floor 70, along with end walls (not shown) enclose the building. An intermediate floor 71 divides the interior into two floors.

The lower story is provided with upper louvers 75 directed from the outside at an upper portion of the room, and lower louvers 76 on the opposite side of the room admit air from the shaded house side. The upper room has lower louvers 77 and upper louvers 78 on the same wall, both communicating to the building exterior. For winter heating, the sun's rays heat the absorber storage wall 60 and the space between it. The eutectic container being heated provides a circulation of air in both rooms by the chimney effect with walls 63 and 64. The eutectic material retains heat for later heating after the sun no longer shines on the absorber. In the absence of the sun, the heating of the room continues by the heat from the storage. The chimney effect between the absorber/storage and insulator creates circulation of air. For summer, or hot weather operation, the louvers are opened so that hot air from the chimney effect flows between the absorber/storage and insulator, then out the upper louvers near the room top. Cooler outside air is drawn in the lower louvers, providing a circulation of air in the rooms. This arrangement does not require building movement to change the operating mode, as the building faces generally south for all modes.

What is claimed is:

1. A building arranged for solar heating and air circulation, positioned to have a sunny side and a shaded side, comprising:
   (a) a generally closed structure providing an interior with ingress and egress and at least one upright wall;
   (b) said upright wall including solar radiation absorbing means covering a substantial area and having a black heat absorbing coating and a mono-layer of transparent focusing spherical elements thereon;
   (c) an internal heat storage unit arranged adjacent the upright wall and in heat transfer relation therewith and in heat transfer relation with the interior of the building;

(d) upper vent means arranged for selective opening for discharge of heated air from the building; and, (e) lower vent means arranged for a selective opening for the building on the shaded side thereof so that heated air from the inside of the upright wall moves outwardly through the upper vent means and air from the shaded side enters the lower vent means.

2. A building according to claim 1, wherein said heat storage unit is in contact with said upright wall.

3. A building according to claim 1 wherein said upper vent means includes said wall being pivotally mounted to open a narrow slit for discharge of heated air.

4. A building according to claim 1 wherein said lower vent means includes wall means pivotally mounted to open a lower narrow slit to admit air from the shaded side of the building.

5. A solar energy conditioned dog house comprising:
(a) a generally closed structure providing an interior with an ingress and an egress and having opposed generally upright walls;
(b) one said upright wall having a substantial area coated with a solar radiation absorbing material;
(c) the opposed said upright wall having a substantial area coated with a reflective surface;
(d) heat storage means internally of said structure in heat conducting relation to said wall coated with a heat absorbing material and in heat transfer relation with the interior of the structure;
(e) upper solar radiation absorbing means adjacent the top of the structure arranged for solar radiation absorption when said reflective surface is sun facing;
(f) selectively openable passage means for air heated by said upper heat absorbing means forming a chimney effect, and said passage means communicating with the structure interior; and
(g) selectively operable vent means in said structure for air from the shaded side thereof when said reflective surface is sun facing.

6. A solar energy conditioned dog house according to claim 5 wherein said solar radiation absorbing material includes a black absorbing surface coated with a mono-layer of transparent focusing spheres.

7. A solar energy conditioned dog house according to claim 5 wherein said structure is a modified "A" frame.

8. A solar radiation conditioned dog house according to claim 7 wherein said upper solar radiation absorbing means includes a metal sheet extending upwardly from the top of the dog house and arranged with a separate sheet so as to be separable and form a chimney effect therebetween when said upper solar radiation absorbing means is sun facing.

9. A solar energy conditioned building comprising:
(a) a generally closed structure providing ingress and egress and having a generally upright wall;
(b) said wall arranged in sun facing position, and having a solar radiation absorbing surface;
(c) a mono-layer of a plurality of transparent focusing spheres secured on said solar radiation absorbing surface;
(d) an interior heat storage means adjacent to and in communication with said absorbing surface;
(e) an insulator member spaced from said interior heat storage means providing an upwardly directed air passage;
(f) selectively openable upper vent means in said structure arranged to discharge heated air rising from said air passage; and
(g) selectively openable lower vents in said structure arranged to open on the shaded side of the structure.

10. A solar energy conditioned building according to claim 9 wherein said structure is multi-floored, and upper and lower vent means arranged for each floor.

11. A solar energy conditioned building according to claim 9 wherein said building is a modified "A" frame.

12. A solar energy conditioned building according to claim 11 wherein said insulator means extends substantially the height of the interior of the solar radiation absorbing wall and said air passage is provided between it snd said insulator with openings at the top and at the bottom thereof for an uninhibited flow of air between the insulator and the storage means.

* * * * *